(12) United States Patent
Kelly et al.

(10) Patent No.: US 11,176,020 B2
(45) Date of Patent: Nov. 16, 2021

(54) SERVER STATUS MONITORING SYSTEM AND METHOD USING BASEBOARD MANAGEMENT CONTROLLER

(71) Applicant: Microsoft Technology Licensing, LLC, Redmond, WA (US)

(72) Inventors: Bryan David Kelly, Redmond, WA (US); Neeraj Ladkani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 16/674,723

(22) Filed: Nov. 5, 2019

(65) Prior Publication Data

US 2021/0133081 A1 May 6, 2021

(51) Int. Cl.
*G06F 11/00* (2006.01)
*G06F 11/36* (2006.01)
*G06F 11/07* (2006.01)
*G06F 11/30* (2006.01)
*G06F 11/32* (2006.01)

(52) U.S. Cl.
CPC ........ *G06F 11/366* (2013.01); *G06F 11/0772* (2013.01); *G06F 11/3006* (2013.01); *G06F 11/327* (2013.01)

(58) Field of Classification Search
CPC ............ G06F 11/0793; G06F 11/0757; G06F 11/3058; G06F 11/0772; G06F 11/0751; G06F 11/30

See application file for complete search history.

(56) References Cited

U.S. PATENT DOCUMENTS 8,935,518 B2 1/2015 Tu
8,935,579 B2 1/2015 Jann et al.
(Continued)

FOREIGN PATENT DOCUMENTS

CN 106528214 A 3/2017
CN 107769953 A 3/2018

OTHER PUBLICATIONS

"Enhanced Health Reporting and Monitoring", Retrieved from: https://web.archive.org/web/20171212075157/http:/docs.aws.amazon.com/elasticbeanstalk/latest/dg/health-enhanced.html, Dec. 12, 2017, 8 Pages.

(Continued)

*Primary Examiner* — Charles Ehne
(74) *Attorney, Agent, or Firm* — Ray Quinney & Nebeker, P.C.; Thomas M. Hardman; Bo Niu

(57) ABSTRACT

A system and method of monitoring a status of a server using a baseboard management controller (BMC) is disclosed. First, the BMC may access a status code generated in Domain 0 of the server through a command line interface to the server and send the status code to an alert management system. Second, the BMC may snoop on a status code generated in the hypervisor of the server through input/output port 80h and send the status code to the alert management system. Third, the BMC may read a status code generated in the hypervisor and written in a Model Specific Register (MSR) and send the status code to the alert management system. The system and method can enable the alert management system to readily recognize the occurrence of an error, including the type of the error which is a software error, and the cause of the error in real time or nearly real time.

19 Claims, 7 Drawing Sheets

(56) References Cited

U.S. PATENT DOCUMENTS

| | | |
|---|---|---|
| 9,003,239 B2 | 4/2015 | Bradley et al. |
| 9,842,003 B2 | 12/2017 | Rao et al. |
| 2007/0226377 A1 | 9/2007 | Jreij et al. |
| 2008/0046546 A1 | 2/2008 | Parmar et al. |
| 2013/0117766 A1* | 5/2013 | Bax ...................... G06F 9/4405 |
| | | 719/323 |
| 2014/0344431 A1 | 11/2014 | Hsu et al. |
| 2015/0058665 A1* | 2/2015 | Guo .................... G06F 11/0793 |
| | | 714/10 |
| 2015/0160960 A1 | 6/2015 | Delco |
| 2015/0355651 A1* | 12/2015 | Balakrishnan .......... G06F 1/206 |
| | | 700/299 |
| 2016/0080210 A1 | 3/2016 | Lai et al. |
| 2016/0261455 A1 | 9/2016 | Su et al. |

OTHER PUBLICATIONS

"HP Integrity Servers with Microsoft Windows Server 2003 Smart Setup Guide", Retrieved from: https://support.hpe.com/hpsc/doc/public/display?docId=emr_na-c01987791, Oct. 1, 2007, 96 Pages.

"Monitoring", Retrieved from: https://web.archive.org/web/20180423051420/https:/bosh.io/docs/monitoring/, Apr. 23, 2018, 3 Pages.

Nelson, Tom, "How to Use the Mac Console App to Diagnose a Crash", Retrieved from: https://blog.macsales.com/45586-how-to-use-the-mac-console-app-to-diagnose-a-crash/, Aug. 21, 2018, 6 Pages.

"International Search Report and Written Opinion Issued in PCT Application No. PCT/US20/057579", dated Feb. 2, 2021, 16 Pages.

\* cited by examiner

SERVER STATUS MONITORING SYSTEM AND METHOD USING BASEBOARD MANAGEMENT CONTROLLER

BACKGROUND

A cloud-based service provides a large pool of shared resources in clusters of servers to users. A central management controller, commonly referred to as a baseboard management controller (BMC), can play an important role in managing servers at a given time. The BMC additionally provides functionality to monitor hardware and detect hardware failures in the server. While the BMC is connected to the servers, the BMC and the servers do not have an established trust relationship for security and confidentiality reasons. Thus, the BMC neither has direct access to the host memory in the servers nor can the BMC initiate communication to the servers. Since the BMC can only detect a hardware failure, not a software failure, the BMC cannot detect a failure in software running on the server, such as the hypervisor or Domain 0. Due to such access limitations and the BMC's design limitations, when the software on the server crashes or hangs, a fabric system connected to the BMC manually initiates the connection into the server and attempts to determine the reason for the software failure after a certain period of time. This retroactive diagnosis causes a time delay and can make it difficult to find the root cause of the failure of the system.

SUMMARY

A first example embodiment is directed to a system for monitoring a status of a server using a command line interface on the server and a baseboard management controller (BMC). The system includes the BMC. The BMC is configured to connect to the server and open a session of a command line interface on the server. The BMC sends a status code request through the session of the command line interface to the server. The BMC determines whether the BMC has received a status code from the server through the session of the command line interface in response to the status code request. When the BMC has not received the status code within a predetermined time, the BMC overwrites the prior status code as an error status code. Then, when the status code indicates an error on the server, the BMC sends the status code to the alert management system.

A second example embodiment is directed to a method of monitoring a status of a server by snooping on input/output (I/O) port 80h in the server. The method includes determining whether the status code has been received from the server by reading the status code provided on I/O port 80h of the server. The status code of the server indicates the status of software running on the server. When the BMC has not received the status code within a predetermined time, the BMC overwrites the previous status code as an error status code. Then, when the status code indicates an error on the server, the BMC sends the status code to an alert management system.

A third example embodiment is directed to a method of monitoring a status of a server by snooping on a Model Specific Register (MSR). The method includes determining whether the BMC has received a status code of the server by reading the MSR. The status code of the server indicates a status of software running on the server. When the BMC has not received the status code within a predetermined time, the BMC overwrites the previous status code as an error status code. When the status code indicates an error on the server, the BMC may send the status code to an alert management system.

These as well as other embodiments, aspects, advantages and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For example, combined, distributed, eliminated, or otherwise changed, while remaining within the scope of the embodiments as claimed.

DETAILED DESCRIPTION

Figure 1:
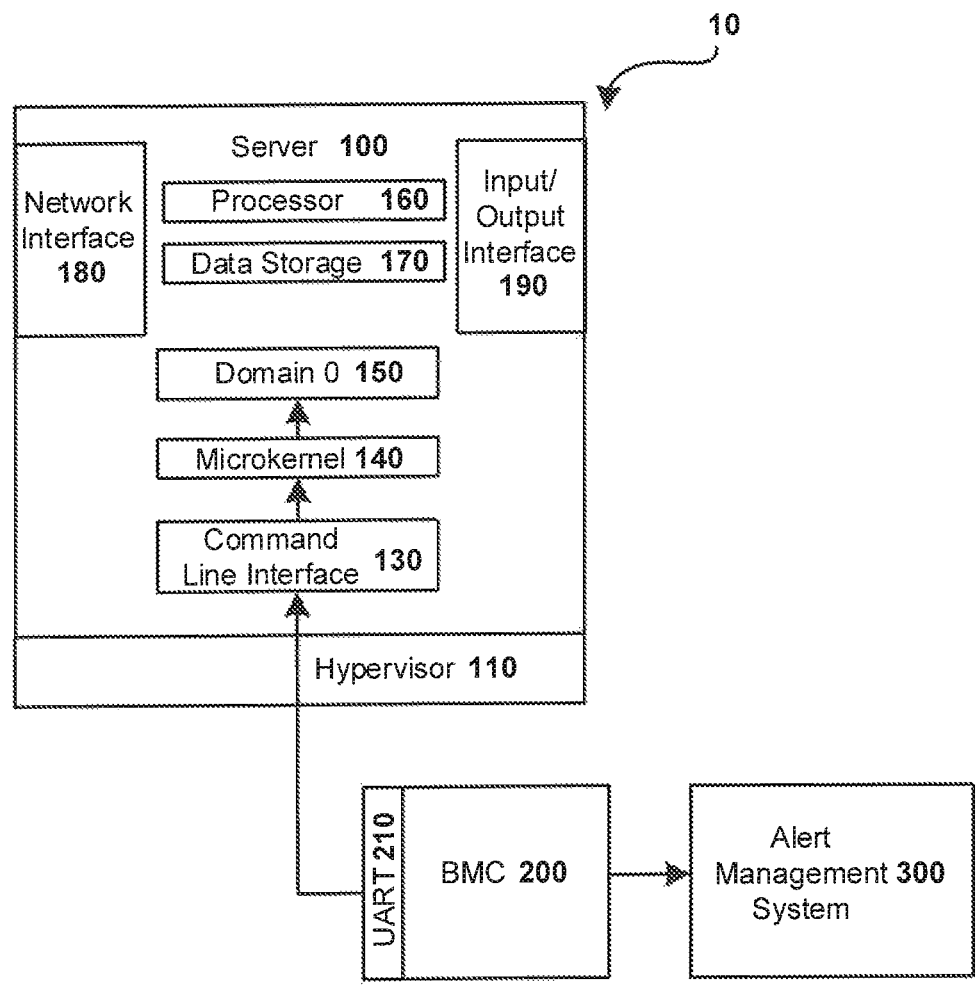
FIG. 1 illustrates an exemplary schematic drawing of a server status monitoring system using a baseboard management controller (BMC).

Reference will now be made in detail to embodiments, examples of which are illustrated in the accompanying drawings. The terminology used in the description herein is for the purpose of describing particular embodiments only and is not intended to be limiting. Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. OVERVIEW

As noted above, FIGS. 1, 4, and 6 illustrate three exemplary schematic diagrams corresponding to three respective example embodiments. As a brief overview, in order to overcome the retroactive diagnosis problem, a baseboard management controller (BMC) 200 may play a role by snooping on a status of software running on a server 100 or host processor 160. The present disclosure describes how the BMC 200 may monitor and detect a software error of software running on the server 100 and how that error can be forwarded to an alert management system 300 which manages the server 100 in real time (or nearly real time), and in an automatic manner. First (FIG. 1), the BMC 200 may access a status code generated in Domain 0 150 of the server 100 through a command line interface 130 over a serial port or Universal Asynchronous Receiver-Transmitter (UART) 210 of the BMC 200 and send the status code to the alert management system 300. Second (FIG. 4), a status code generated in the hypervisor 110 of the server 100 may be provided on input/output (I/O) port 80h 120 of the server 100, the BMC 200 may snoop on I/O port 80h and obtain the status code, and the BMC 200 may send the status code to the alert management system 300. Third (FIG. 6), a status code generated in the hypervisor 110 may be written in a Model Specific Register (MSR) 121, the BMC 200 may obtain the status code by reading the MSR 121, and the BMC 200 may send the status code to the alert management system 300. These exemplary system and methods to monitor a status of the server 100 would enable the alert management system 300 to readily recognize the occurrence of an error, including the type of error (such as a software error), and the cause of the error in real time or nearly real time. Therefore, these exemplary methods can overcome the time delay and the difficulty in finding the root cause of the failure of the server 100 found in the retroactive diagnostic method.

2. EXAMPLE SERVER STATUS MONITORING SYSTEM USING BMC AND COMMAND LINE INTERFACE IN SERVER a. Server Hardware Components FIG. 1 is a simplified block diagram exemplifying a server status monitoring system 10 using a BMC 200 and a command line interface 130 running on a server 100. In this example, the server 100 may include a processor 160, a data storage 170, a network interface 180, and input/output interface(s) 190, all of which may be coupled by a system bus or a similar mechanism. The processor 160 may include one or more central processing units (CPUs), such as one or more general purpose processors and/or one or more dedicated processors (e.g., application specific integrated circuits (ASICs), digital signal processors (DSPs), and/or network processors).

The data storage 170, in turn, may include volatile and/or non-volatile data storage, and may be integrated in whole or in part with the processor 160. The data storage 170 may store program instructions, executable by the processor 160, and data that may be manipulated by the instructions to carry out the various methods, processes, or functions described herein. Alternatively, these methods, processes, or functions can be defined by hardware, firmware, and/or any combination of hardware, firmware, and software. By way of example, the data in the data storage 170 may include program instructions, perhaps stored on a non-transitory, computer-readable medium, executable by a processor 160 to carry out any of the methods, processes, or functions disclosed in this specification or the accompanying drawings.

The input/output interface 190 may take the form of a wireline connection, such as an Ethernet, Token Ring, or T-carrier connection. The network interface 180 may also take the form of a wireless connection, such as IEEE 802.11 (Wifi), BLUETOOTH®, or a wide-area wireless connection. However, other forms of physical layer connections and other types of standard or proprietary communication protocols may be used. Furthermore, the server 100 may have out-of-band network channels with the BMC 200 because the server 100 and the BMC 200 do not have an established trust relationship for security, confidentiality, or other reasons. One out-of-band network channel is a serial line connection between the server 100 and a UART 210 in the BMC 200. This serial line connection to the UART 210 enables the BMC 200 to diagnose software of the server 100 in both active and inactive serial sessions to the server 100.

Figure 2:
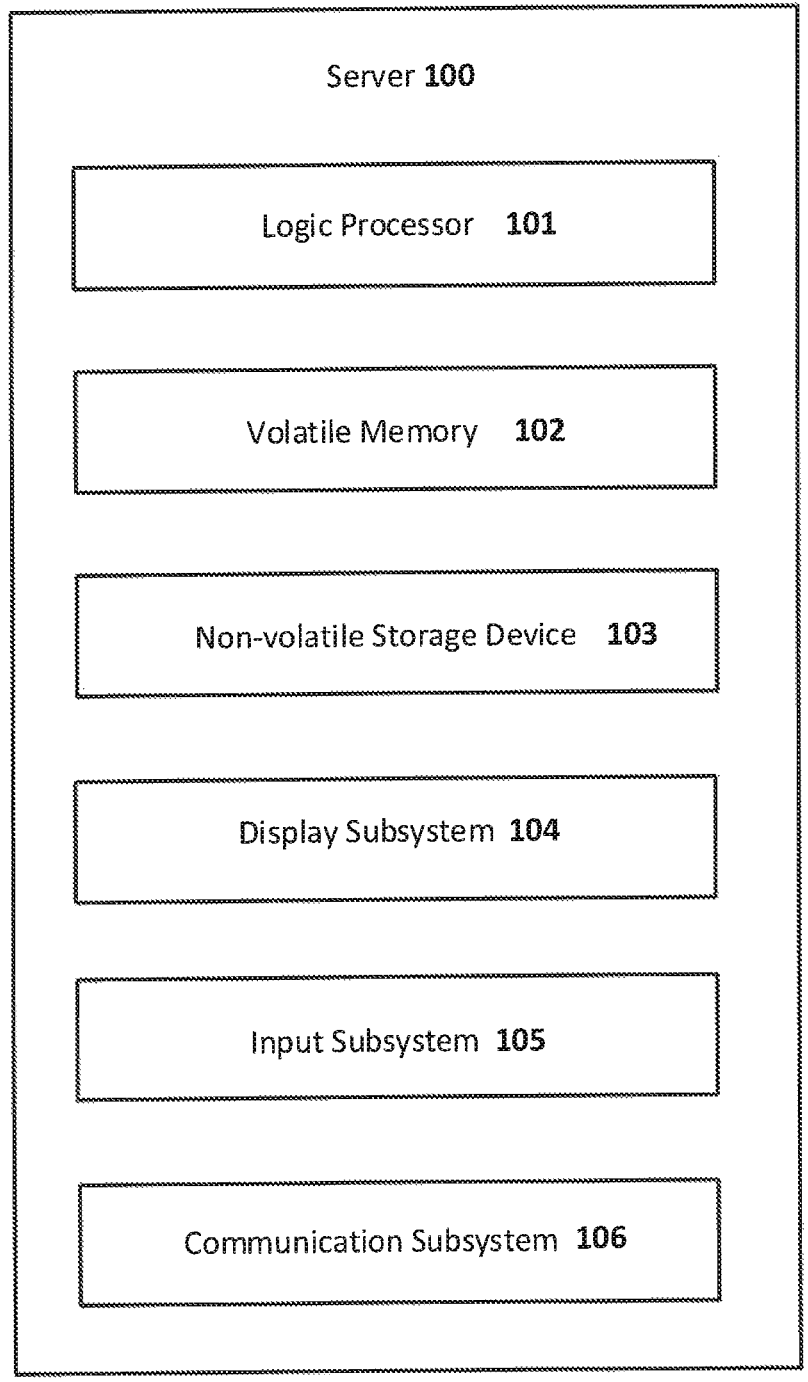
FIG. 2 illustrates an example server system according to an embodiment of the present disclosure

FIG. 2 schematically shows a non-limiting embodiment of the server 100 described above. The server 100 is shown in simplified form. The server 100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

The server 100 includes a logic processor 101, volatile memory 102, and a non-volatile storage device 103. The server 100 may optionally include a display subsystem 104, input subsystem 105, communication subsystem 106, and/or other components not shown in FIG. 2.

Logic processor 101 includes one or more physical devices configured to execute instructions. For example, the logic processor 101 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. The logic processor 101 may be the same as the processor 160 in FIGS. 1, 4, and 6.

The logic processor 101 may include one or more physical processors (hardware) configured to execute software instructions. Additionally or alternatively, the logic processor 101 may include one or more hardware logic circuits or firmware devices configured to execute hardware-implemented logic or firmware instructions. Processors of the logic processor 101 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines.

Non-volatile storage device 103 includes one or more physical devices configured to store instructions executable by the logic processors to implement the methods and processes described herein. When such methods and processes are implemented, the state of non-volatile storage device 103 may be transformed—e.g., to store different data.

Non-volatile storage device 103 may include physical devices that are removable and/or built-in. Non-volatile storage device 103 may include optical memory (e.g., CD, DVD, HD-DVD, Blu-Ray Disc), semiconductor memory (e.g., ROM, EPROM, EEPROM, FLASH memory), and/or magnetic memory (e.g., hard-disk drive, floppy-disk drive, tape drive, MRAM), or other mass storage device technology. Non-volatile storage device 103 may include nonvolatile, dynamic, static, read/write, read-only, sequential-access, location-addressable, file-addressable, and/or content-addressable devices. It will be appreciated that non-volatile storage device 103 is configured to store instructions even when power to the non-volatile storage device 103 is cut.

Volatile memory 102 may include physical devices that include random access memory. Volatile memory 102 is typically utilized by logic processor 101 to temporarily store information during processing of software instructions. It will be appreciated that volatile memory 102 typically does not continue to store instructions when power is cut to the volatile memory 102. The data storage 170 in FIGS. 1, 4, and 6 includes the volatile memory 102, and the non-volatile storage device 103.

Aspects of logic processor 101, volatile memory 102, and non-volatile storage device 103 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "mechanism," and "engine" may be used to describe an aspect of the server 100 typically implemented in software by a processor to perform a particular function using portions of volatile memory, which function involves transformative processing that specially configures the processor to perform the function. Thus, a module, program, or engine may be instantiated via logic processor 101 executing instructions held by non-volatile storage device 103, using portions of volatile memory 102. It will be understood that different modules, programs, mechanisms and/or engines may be instantiated from the same application, service, code block, object, library, routine, API, function, etc. Likewise, the same module, program, mechanism and/or engine may be instantiated by different applications, services, code blocks, objects, routines, APIs, functions, etc. The terms "module," "program," "mechanism" and "engine" may encompass individual or groups of executable files, data files, libraries, drivers, scripts, database records, etc.

When included, display subsystem 104 may be used to present a visual representation of data held by non-volatile storage device 103. The visual representation may take the form of a graphical user interface (GUI). As the herein described methods and processes change the data held by the non-volatile storage device, and thus transform the state of the non-volatile storage device, the state of display subsystem 104 may likewise be transformed to visually represent changes in the underlying data. Display subsystem 104 may include one or more display devices utilizing virtually any type of technology. Such display devices may be combined with logic processor 101, volatile memory 102, and/or non-volatile storage device 103 in a shared enclosure, or such display devices may be peripheral display devices.

When included, input subsystem 105 may comprise or interface with one or more user-input devices such as a keyboard, mouse, touch screen, or game controller.

When included, communication subsystem 106 may be configured to communicatively couple various computing devices described herein with each other, and with other devices. Communication subsystem 106 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow the server 100 to send and/or receive messages to and/or from other devices via a network such as the Internet. The communication subsystem 106 may be the same as the network interface 180 in FIGS. 1, 4, and 6.

b. Server Software Components

The processor 160 of the server 100 may run software including a hypervisor 110, a command line interface 130, a mini-kernel 140, and Domain 0 150. The hypervisor 110 or virtual machine monitor may be computer software that creates and runs virtual machines. The hypervisor 110 virtualizes the server's hardware. The hypervisor 110 shares the server's virtualized CPUs, memory, and network resources among domains which do not depend on the server's hardware specification. The hypervisor 110 may control the server's hardware and the domains. The hypervisor 110 controls and manages user domains among the domains through a special domain, referred to as Domain 0 150, dom0, or enlightened guest. In one configuration, the user domains may instead be unprivileged domains with no direct access to the server's hardware. While the hypervisor 110 controls the server's hardware, the hypervisor 110 may leave a status of the hypervisor 110 in the data storage 170. The status of the hypervisor 110 may indicate the last process the hypervisor 110 performed, or what process the hypervisor 110 is performing. If the status of the hypervisor 110 indicates an error in the hypervisor 110, the status may indicate where and why the hypervisor 110 encountered the error (or why the hypervisor 110 has crashed).

A command line interface 130, a serial console interface or Special Administration Console (SAC) for Microsoft Windows, may access Domain 0 150 and the mini-kernel 140 via a serial port (or other port) even when the server 100 is unresponsive. The command line interface 130 plays an input/output interface role for the BMC 200 to access the server 100, in particular Domain 0 150. This out-of-band communication is particularly effective when the server 100 is unresponsive or in a crash state. The command line interface 130 may collect a crash dump of the server 100. Thus, if Domain 0 150 or user domains which Domain 0 150 controls are in a crash state or unresponsive, the command line interface 130 may snoop on the crash dump and leave an error status of Domain 0 150 or user domains in the data storage 170. The error status of Domain 0 150 or user domains may indicate where and why Domain 0 150 or user domains are in error or in a crash mode. If the command line interface 130 can access the hypervisor 110, the command line interface 130 may provide a status not only of Domain 0 150 or user domains, but also of the hypervisor 110. However, some servers do not provide command line interface 130 access to the hypervisor 110 because the command line interface 130 is in a higher software stack than the hypervisor 110. In that case, an example server status monitoring system 20 using I/O port 80h 120 in the server 100 or an example server status monitoring system 30 described in further detail below in the discussion related to FIG. 6 which uses a Model Specific Register (MSR) 121 can be used to snoop on the status of the hypervisor 110.

c. Baseboard Management Controller (BMC)

The BMC 200 is a central management controller, which is usually a system on a chip (SoC) embedded within a main circuit board or on a motherboard. The BMC 200 can communicate with the server 100 through out-of-band channels. The BMC 200 may monitor hardware connected to the motherboard such as power supply voltage, fan speeds, humidity, and temperature. Because the BMC 200 does not have any direct capacity to monitor software running on the server 100, a serial port in the BMC 200 may be used to connect to the command line interface 130 to diagnose the status of software running on the server 100. The serial port may be a special controller chip, such as the UART 210, which enables the BMC 200 to communicate via a serial line. The BMC 200 may diagnose certain data of the server 100 through the command line interface over the UART 210. However, it should be appreciated that the serial port is not limited to the UART 210 to communicate with the command line interface 130. Any other appropriate interface in the BMC 200 to communicate with the command line interface 130 can also be employed. For example, a system management bus (SMBus) in the BMC 200 may be connected to the BMC's Network Interface Chip (NIC) or a local area network (LAN) controller. Thus, the BMC 200 may open a session of the command line interface 130 of the server 100 via NIC or the LAN. The LAN traffic from the command line interface 130 complies with Serial Over LAN (SOL). The LAN traffic may include the server status code, allowing the BMC 200 to access this information.

The BMC 200 may be connected to a non-volatile data storage. The non-volatile data storage can be integrated in whole or in part with the BMC 200. The data storage can hold system event logs (SEL), a sensor data record (SDR) repository, field-replaceable unit (FRU) inventory information and the server status code. The server status code may be saved in the non-volatile data storage. However, the server status code may also be directly forwarded to the alert management system 300 without first residing within the data storage. In this case, the server status code, which is saved in a cache, is directly forwarded to the alert management system 300. This may increase efficiency by reducing computing power while saving time it takes to save the code in the data storage; and also allows the server 300.

The BMC 200 also communicates with the alert management system 300 via out-of-band channels. The BMC 200 may forward the server software status code and/or hardware status code to the alert management system 300. A serial port in the BMC 200 may be connected to the alert management system 300 to transmit the server software status code and hardware status code. The serial port may be a special controller chip, such as the UART 210, which enables the BMC 200 to communicate via a serial line. However, it should be appreciated that the UART 210 is not the only port to communicate with the alert management system 300. Any other appropriate interface in the BMC 200 to communicate with the alert management system 300 can be employed. For example, a SMBus in the BMC may be connected to the Network Interface Chip or LAN controller. The LAN connects the Network Interface Chip to the alert management system 300. The LAN traffic to the alert management system 300 complies with SOL. The LAN traffic may include the server status code.

d. Alert Management System

The alert management system 300 is connected to the BMC 200 via out-of-band channels. The alert management system 300 receives a server status code from the BMC 200 and provides an alert that an error on the server 100 exists in real time or nearly real time. The alert management system 300 may be a fabric computing system and use a publish-subscribe or pub/sub mechanism. The pub/sub mechanism enables the alert management system 300 to be independent from the BMC 200. Further, the BMC 200 does not need to program the status code of the server 100 to send it directly to a subscriber in the pub/sub mechanism. Rather, the status code of the server 100 may be classified into types of errors such as Domain 0 errors, hypervisor errors, and hardware errors. The classified status code may be sent to an appropriate alert management system 300 that can handle the specific type of error. However, it should be appreciated that the mechanism to send the status code of the server 100 to the alert management system 300 is not limited to the pub/sub mechanism. An observable pattern and other appropriate mechanisms may be used to send the status code of the server 100 to the alert management system 300.

e. Communications Between Server and BMC

The command line interface 130 may be communicated to the server 100 via a serial port. The serial port on the server 100 may be connected to the UART 210 in the BMC 200 via a LAN using SOL. However, it should be appreciated that other communication channels may be used to connect the server 100 and the BMC 200. For example, a Low Pin Counter (LPC) bus may be exploited to connect the server 100 and the BMC 200. When exploiting SOL, the command line interface 130 may transmit the server status code over the LAN. Further, other than the physical connection, the network interface 180 may take the form of a wireless connection, such as IEEE 802.11 (Wifi), BLUETOOTH®, or a wide-area wireless connection as well.

f. Method to Monitor Server Status Using BMC

Figure 3:
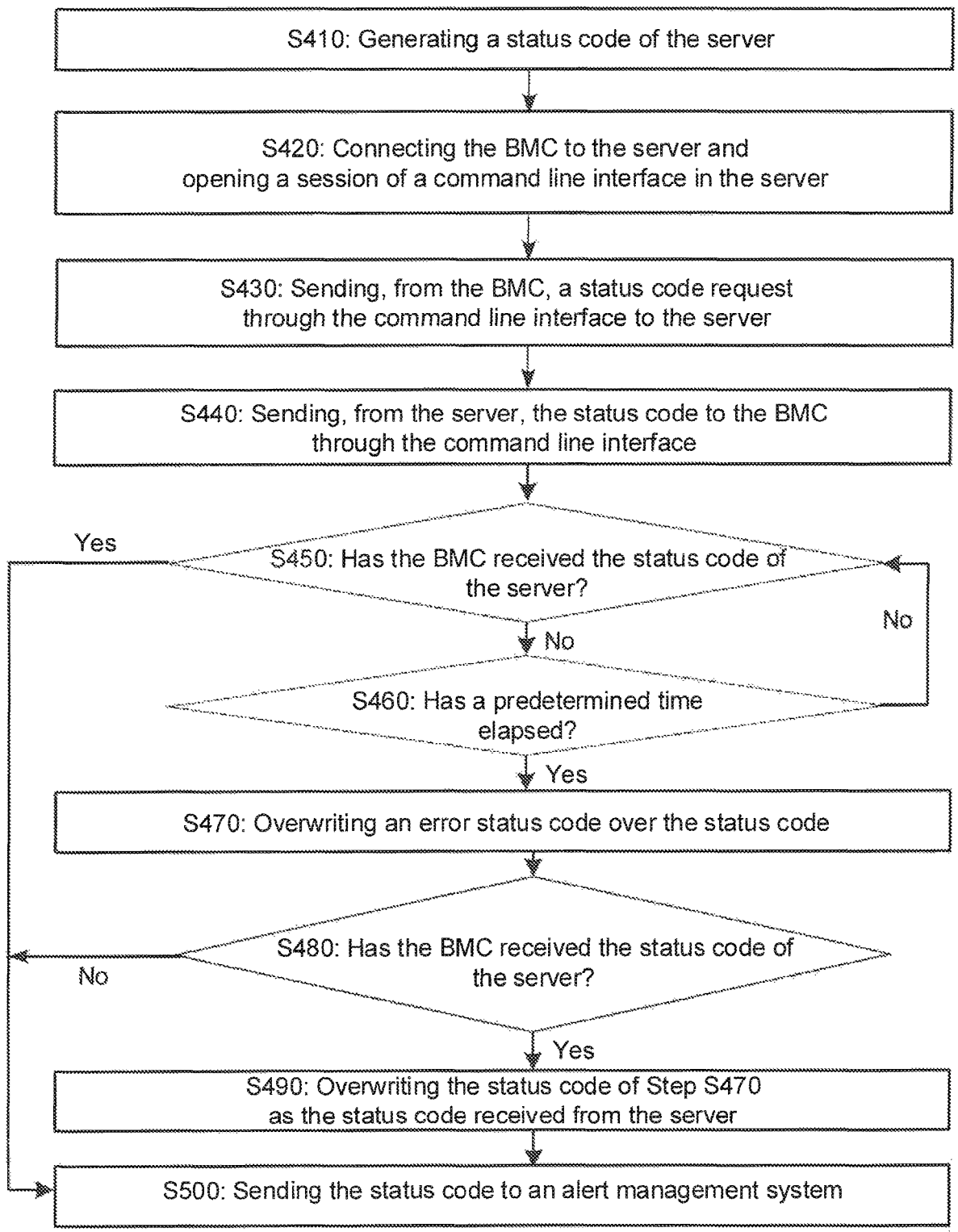
FIG. 3 is a flow chart, according to an example embodiment.

FIG. 3 illustrates a flow chart of a method to monitor a server status using the BMC 200. In operation S410, a status code of the server 100 is generated. The status code of the server 100 may be generated in a data storage 170 in Domain 0 150 of the server 100. The status code of the server 100 may be a status of software running on the server 100. The software may include the hypervisor 110, Domain 0 150, and user domains. Some command line interfaces 130 only have access to Domain 0 150 and user domains, and not to the hypervisor 110. If so, the status code of the server 100 may be limited to the status of Domain 0 150 and user domains. In that case, the status of the hypervisor 110 may be monitored by an example server status monitoring system 20 snooping on I/O port 80h 120 in the server 100 (see FIG. 4) or an example server status monitoring system 30 using a Model Specific Register (MSR) 121 (see FIG. 6) described below. A default status code indicates a good, properly working, or an error-free status of the software. However, when an error exists in the software, an error status code indicating the error overwrites the previous status code. The error status code may include where and why the error occurred.

In operation S420, the BMC 200 may be connected to the server 100 and may be able to open a session of the command line interface 130 on the server 100 over a serial port (UART) of the BMC 200. The command line interface 130 can access Domain 0 150 and retrieve the status code of the server 100 that is in Domain 0 150.

In operation S430, the BMC 200 may send a status code request through the command line interface 130 to the server 100.

In operation S440, in response to the status code request by the BMC 200, the server 100 sends the status code to the BMC 200 through the command line interface 130. The BMC 200 can diagnose the status code printed on the command line interface 130 from the server 100. The BMC 200 may open a session of the command line interface 130 and send the status code request to the server 100 at regular intervals. The signals sent or received on a regular basis can be used as a heartbeat to synchronize other hardware connected to the BMC 200. Further, this can be used as a request response model.

In operation S450, it is determined whether the BMC 200 has received the status code of the server 100. The BMC 200 can receive the status code of the server 100 by reading the status code printed on the command line interface 130. The UART 210 disposed in the BMC 200 is a serial port to receive the status code of the server 100 through the command line interface 130.

If the BMC 200 has received the status code of the server 100, in operation S500 the status code of the server 100 is sent to the alert management system 300. If in operation S450, it is determined that the BMC 200 has not received the status code of the server 100, then in operation S460, the BMC 200 determines whether a predetermined time has elapsed. If the predetermined time has not elapsed, then operation S460 returns to operation S450. If the predetermined time has elapsed, then in operation S470, the BMC 200 makes a tentative conclusion that the server 100 is in error. This failure to receive the status code may indicate two possible scenarios: 1) the BMC 200 has not received a status code as a server response to the BMC's status code request, or 2) the BMC 200 anticipates status codes at a regular interval, but has not received a status code after the interval.

The tentative conclusion that the server 100 is in error prompts the BMC 200 to overwrite the status code as an error status code in operation S470. After the status code is overwritten, in operation S480, it is again determined whether the BMC 200 has received the status code. If the BMC has received the status code from the server 100, then in operation S490, the status code is overwritten as the status code received from the server 100. This may prevent the BMC 200 from sending an error message to the alert management system 300 too hastily when network traffic may delay the status code from being received. In operation S500, the BMC 200 sends the status code to the alert management system 300 when the status code indicates an error on the server 100. In one configuration, the status code may be sent to the alert management system 300 only when the status code indicates an error on the server 100. In another configuration, the status code may be sent to the alert management system 300 regardless of the indication of an error on the server 100. In that case, the alert management system 300 may filter out error status codes and handle the error on the server 100.

Since these operations are automatically processed, the alert management system 300 would readily know the software error on the server 100 almost in real time.

Figure 4:
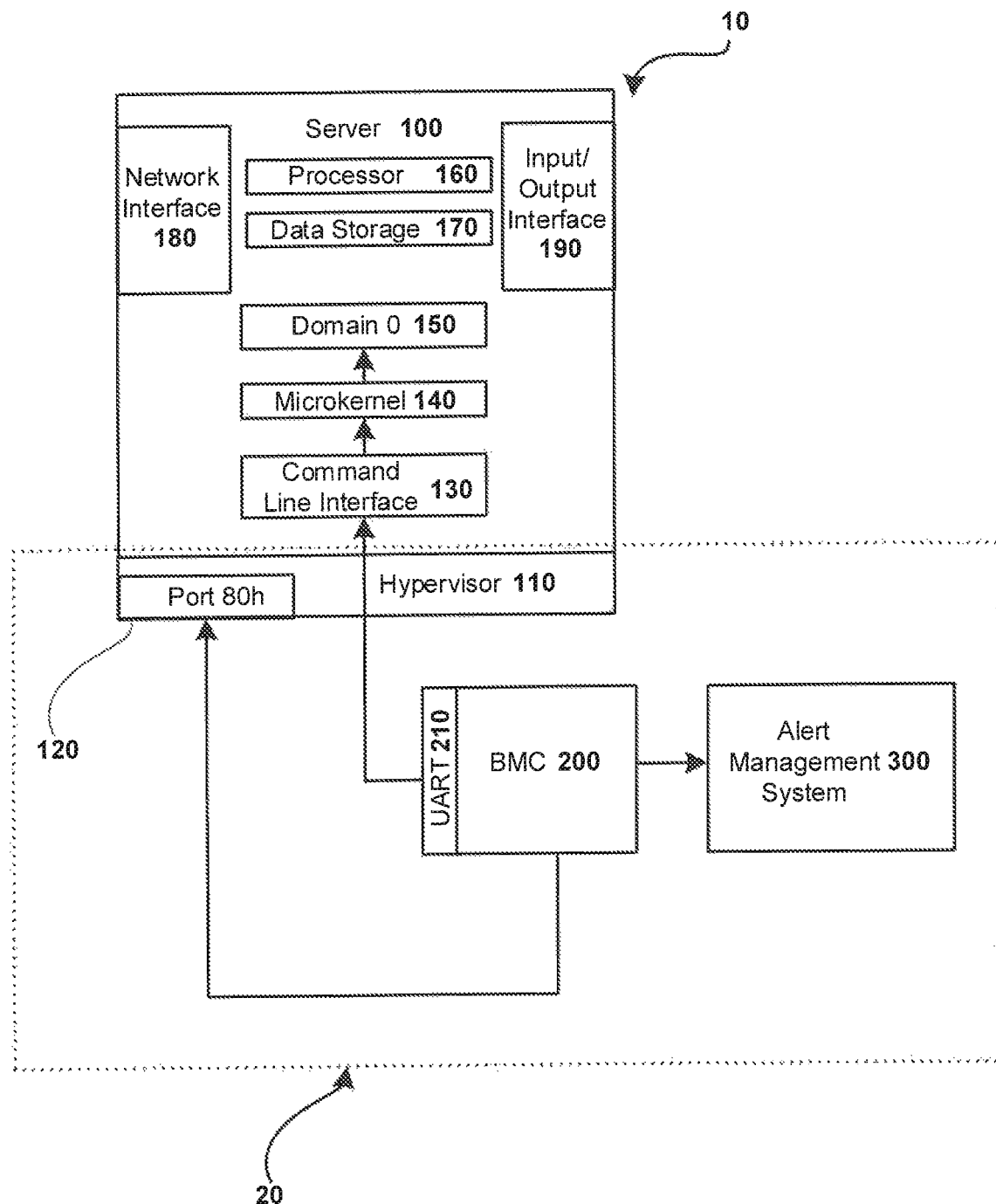
FIG. 4 illustrates a second exemplary schematic drawing of a server status monitoring system using a BMC.

3. EXAMPLE SERVER STATUS MONITORING SYSTEM USING I/O PORT 80h IN SERVER a. Server I/O Port FIG. 4 is a simplified block diagram also exemplifying a server status monitoring system 20 snooping on an I/O port 120 in the server 100. The I/O port may be I/O port 80h 120 in the server. The server 100 may send a status code of the server 100 to I/O port 80h 120 in the server 100. The BMC 200 may snoop on I/O port 80h 120 and receive the status code of the server 100 by reading the status code on I/O port 80h 120. Then, the BMC 200 may send the status code of the server 100 to the alert management system 300.

The BMC 200 generally has I/O port 80h 120 snooping capability on the server 100 using Power-On Self Test (POST) codes. The codes are generated and sent to I/O port 80h 120 when the basic input/output system (BIOS) performs built-in self tests for hardware. The basic health of hardware is generally related to hardware including host processors, memory/chipsets, input/output busses, output devices, input devices, and boot devices. However, I/O port 80h 120 of the server 100 can be used in a different way to diagnose software running on the server 100. The status of the software may be a status of the last process performed by the hypervisor 110, Domain 0 150, or the user domains. The status of the software may also be a status currently being performed by the hypervisor 110, Domain 0 150, or the user domains. If the status of the hypervisor 110, Domain 0 150, or the user domains indicates an error, the status may indicate where and why the hypervisor 110, Domain 0 150, or the user domains are in error or in a crash state. However, the status of the software may be limited to the status of the hypervisor 110, and the hypervisor 110 may not access Domain 0 150 and the user domains because the hypervisor 110 is a lower level of software in the software stack.

The status code may indicate the status of the hypervisor 110, Domain 0 150, or the user domains if the hypervisor 110 can perform monitoring of the status of the hypervisor 110, Domain 0 150, and the user domains. If the hypervisor 110 is limited to monitoring only the status of the hypervisor 110 or if the command line interface 130 cannot access the hypervisor 110, the status code may be limited to a status of the hypervisor 110. In this case, the example monitoring system 10 using the BMC 200 and the command line interface 130 may be additionally employed. Thus, in addition to the monitoring of Domain 0 150 and user domains through the command line interface 130, the hypervisor 110 may independently send the status of the hypervisor 110 to I/O port 80h 120 of the server 100.

b. Method to Monitor Server Status Using BMC

Figure 5:
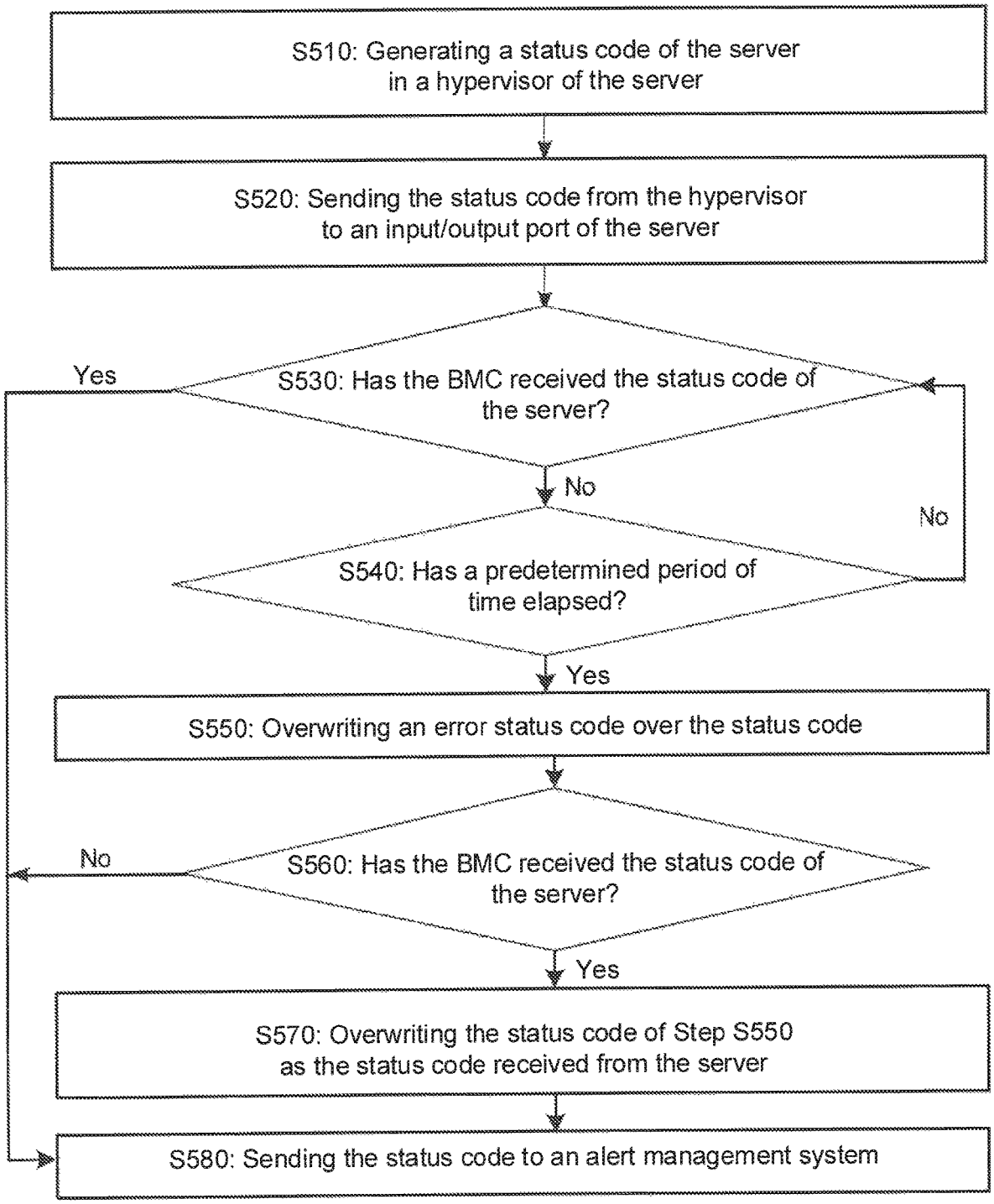
FIG. 5 is a flow chart, according to a second example embodiment.

FIG. 5 illustrates a flow chart of a method to monitor a server status by snooping on I/O port 80h 120 in the server 100. In operation S510, a status code of the server 100 may be generated in a hypervisor 110 of the server 100. The status code of the server 100 may be saved in a data storage 170, and the hypervisor 110 may access the data storage 170. However, the status code of the server 100 may be sent directly to I/O port 80h 120 in the server without being saved in the data storage 170. The status code of the server 100 may be a status of software running on the server 100. The software may include the hypervisor 110, Domain 0 150, and user domains. A default status code indicates an error-free or properly functioning status of the software. However, when an error exists in the software, the status code is overwritten as an error status code indicating the error. The error status code may include information relating to the timing of the error, the specific point of failure, and the reasons of failure among other information.

In some cases, the hypervisor 110 may not have access to a status code of Domain 0 150 and user domains due to different software stacks. In such a case, the hypervisor 110 may only generate a status code of the hypervisor 110. In order to monitor a status of Domain 0 150 and user domains, the exemplary monitoring system using the command line interface 130 and the BMC 200 described above may also be employed.

However, in some embodiments, the hypervisor 110 may monitor a status of the hypervisor 110, Domain 0 150, and user domains by accessing a status code saved in the data storage 170. The data storage 170 includes a status of Domain 0 150, and user domains. In that case, the exemplary monitoring system using the command line interface 130 and the BMC 200 (see FIG. 1) described above may not be necessary.

In operation S520, the hypervisor 110 sends the status code to an I/O port 120 of the server 100. The hypervisor 110 may send the status code to the I/O port 120 at a regular interval. The signals sent on a regular basis can be used as a heartbeat to synchronize other hardware connected to the BMC 200. The I/O port 120 of the server 100 may be I/O port 80h 120 of the server 100. Even when the server 100 is unresponsive or in a crash state, these out-of-band communications may be operational, and may also determine the cause of the system failure by snooping on I/O port 80h 120 of the server 100, and reporting the failure and the cause to the alert management system 300 almost in real time.

In operation S530, the BMC 200 determines whether the BMC 200 has received the status code through I/O port 80h 120 of the server 100. The BMC 200 can receive the status code of the server 100 by reading the status code provided on I/O port 80h 120 of the server 100.

In operation S530, it is determined whether the BMC 200 has received the status code of the server 100. If the BMC 200 has received the status code of the server 100, operation S580 follows. In operation S580, the status code of the server 100 is sent to the alert management system 300. If during operation S530 it is determined that the BMC 200 has not received the status code of the server 100, then in operation S540, the BMC 200 determines whether a predetermined time has elapsed. If the predetermined time has not elapsed, then operation S540 returns to operation S530. On the other hand, if it is determined in operation S540 that the predetermined time has elapsed, then in operation S550, the BMC 200 makes a tentative conclusion that the server 100 is in error. This failure to receive the status code may include a scenario in which the BMC 200 anticipates status codes at a regular interval, but does not receive a status code after the interval. The tentative conclusion causes the status code to be overwritten as an error status code in operation S550. However, after the status code is overwritten due to the elapsed time, in operation S560 it is re-determined whether the BMC 200 has received the status code from the server 100. Then, if the BMC has received the status code from the server 100 in operation S570, the status code in operation S550 is overwritten to the status code received from the server 100. This may prevent the BMC 200 from sending an error message to the alert management system 300 too hastily when network traffic (or another issue unrelated to the server) may delay the status code from being received. In operation S580, the BMC 200 sends the status code to the alert management system 300 when the status code indicates an error on the server 100. If the status code indicates an error on the server 100, the status code may be sent to the alert management system 300. However, the status code may be sent to the alert management system 300 regardless of the indication of an error on the server 100, or for a group of specific status codes. In that case, the alert management system 300 may filter out error status codes and handle the error on the server 100.

Since these operations are automatically processed, the alert management system 300 would readily know the software error on the server 100 almost in real time.

4. EXAMPLE SERVER STATUS MONITORING SYSTEM USING MSR a. Model Specific Register (MSR)

Figure 6:
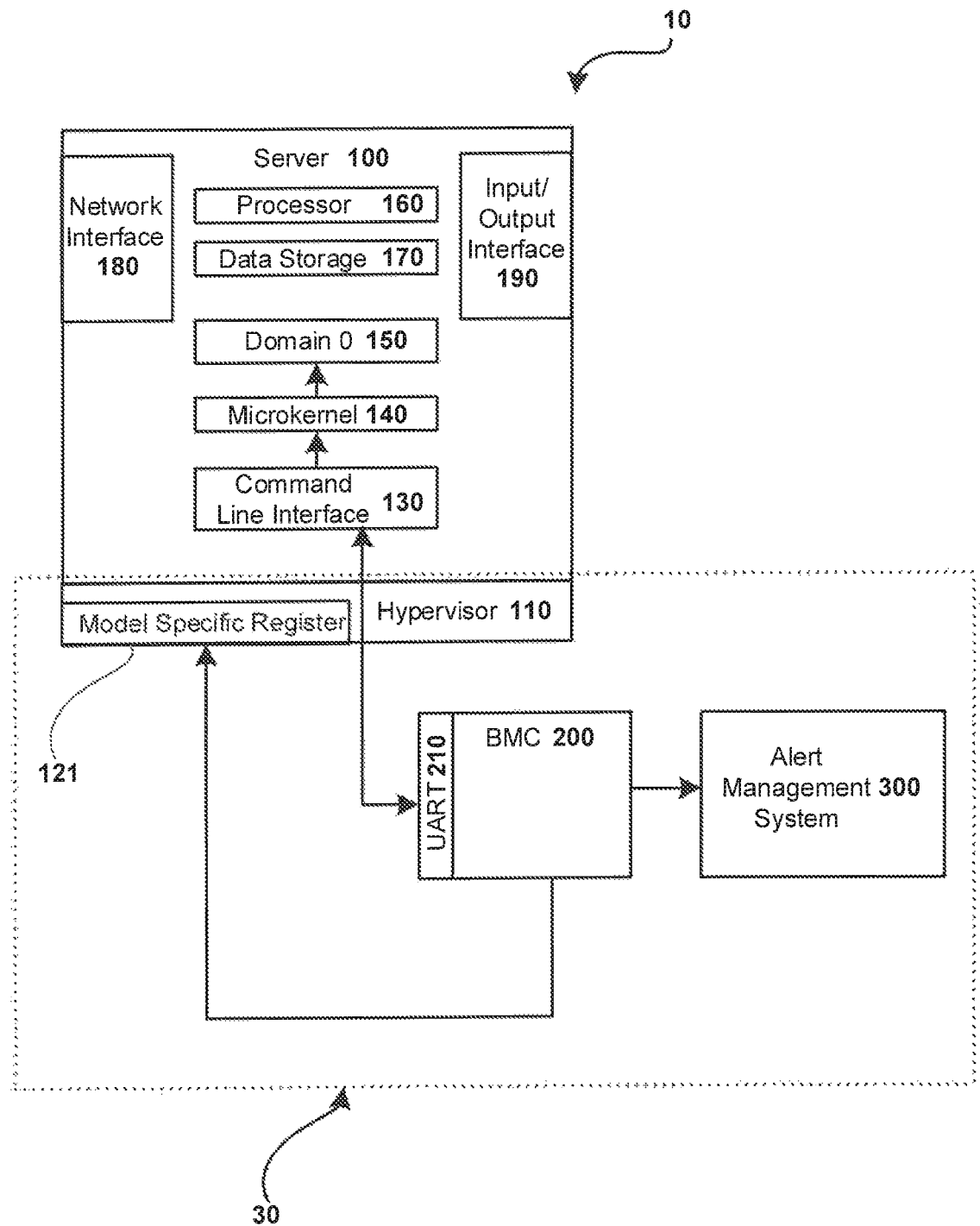
FIG. 6 illustrates a third exemplary schematic drawing of a server status monitoring system using a BMC.

FIG. 6 is a simplified block diagram exemplifying a server status monitoring system 30 using a BMC 200 and a MSR which may be accessible to the server 100 and the BMC 200. The MSR 121 may be called a scratch register, Mode Specific Register, or Machine Specific Register. Some BMCs may not include I/O port 80h 120 shown in FIG. 4, or it may be desirable or necessary to use an alternate system. Alternatively, the MSR 121 shown in FIG. 6 may be used instead of I/O port 80h 120 to receive the server status code. The BMC 200 may provide a mechanism for detecting and reporting hardware (machine) errors, such as: system bus errors, ECC errors, parity errors, cache errors, and TLB errors. The BMC 200 may access a set of model specific registers (MSRs) that are used to set up machine checking and additional banks of MSRs used for recording errors that are detected. The MSRs are generally used to check hardware errors. However, a MSR 121 may be programmed for use in detecting software errors in the server 100. The MSR 121 may be disposed on the server 100 or on the BMC 200.

The hypervisor 110 may monitor the status of software running on the server 100 and request the processor 160 in the server 100 to write a status code of the status of software running on the server 100 into the MSR 121. The processor 160 may instruct the status code of the server 100 to be written into the MSR 121. The status code of the server 100 may be a status of the hypervisor 110, Domain 0 150, or the user domains if the hypervisor 110 can monitor (or "can perform the monitoring of") the status of the hypervisor 110, Domain 0 150, and the user domains. If the hypervisor 110 is limited to performing monitoring of the status of the hypervisor 110, or a command line interface 130 may not have access to the hypervisor 110, the status code would be limited to a status of the hypervisor 110. In such a case, the example monitoring system 10 using the BMC 200 and the command line interface 130 (see FIG. 1) may be additionally employed.

The status code written into the MSR 121 may be accessible to the BMC 200. The BMC 200 may receive the status code of the server 100 by reading the MSR 121. By analyzing the status code of the server 100, the BMC 200 may recognize where and why software running on the server 100 encountered the error.

Other components in this exemplary server status monitoring system 30 may be the same or similar as those in the example server status monitoring system 20 using I/O port 80h 120 of the server 100.

b. Method to Monitor Server Status Using BMC

Figure 7:
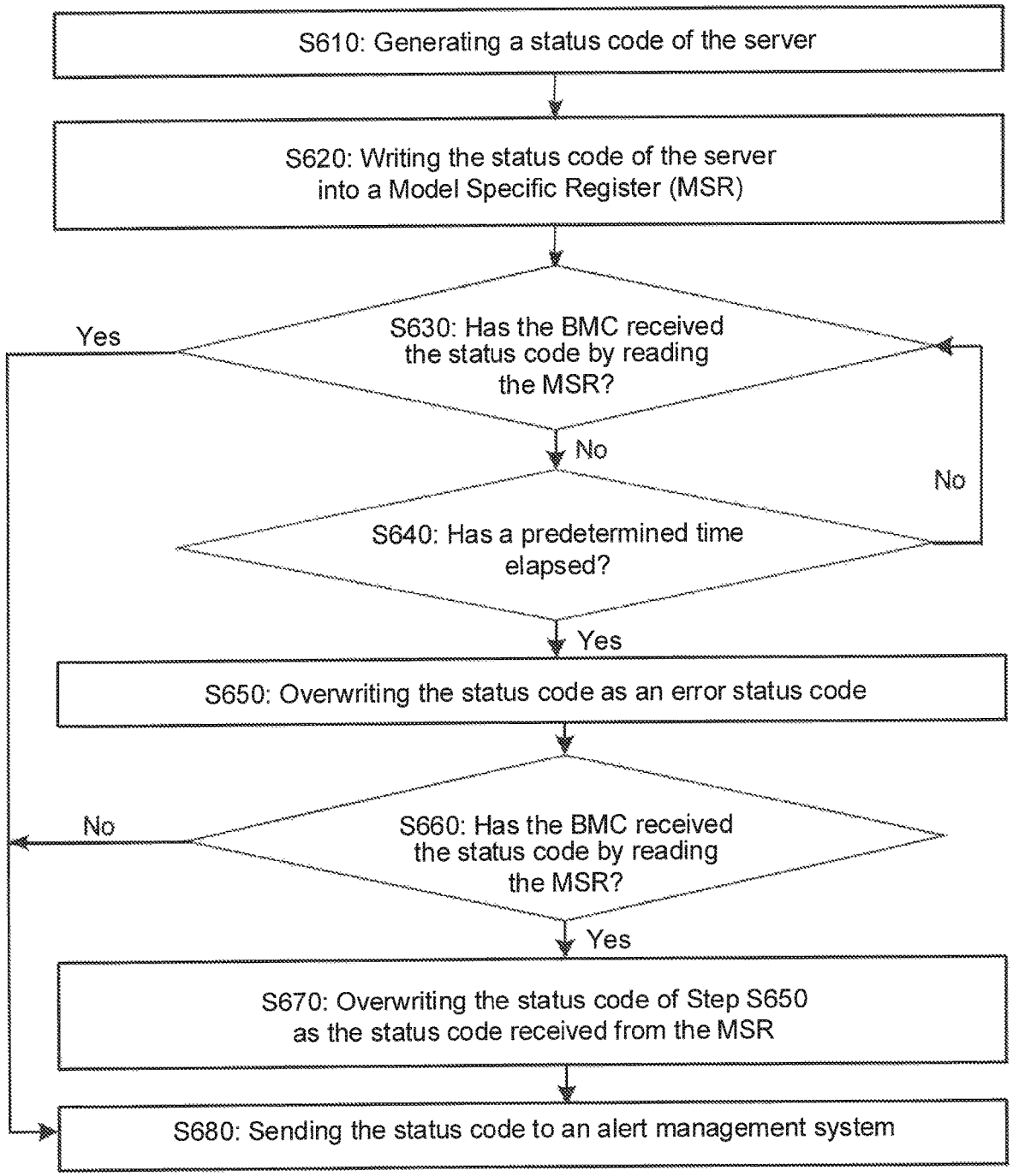
FIG. 7 is a flow chart, according to a third example embodiment.

FIG. 7 illustrates a flow chart of a method to monitor a server status using the MSR 121, which is accessible from the BMC 200. In operation S610, a status code of the server 100 may be generated in a hypervisor 110 of the server 100. The status code of the server 100 may be saved in a data storage 170, and the hypervisor 110 may access the data storage 170. However, the status code of the server 100 may be directly written into the MSR 121 without being saved in the data storage 170. The status code of the server 100 may be a status of software running on the server 100. The software may include the hypervisor 110, Domain 0 150, and user domains. A default status code indicates a good status of the software. However, when an error exists in the software, the status code is overwritten as an error status that indicates the error. The error status code may include where and why the error has occurred.

In some cases, the hypervisor 110 may not have access to a status code of Domain 0 150, and user domains. In such a case, the hypervisor 110 may only monitor the hypervisor 110 and generate a status code of the hypervisor 110. For monitoring a status of Domain 0 150, and user domains, the exemplary monitoring system using the command line interface 130 and the BMC 200 described above (see FIG. 1) may be additionally necessary.

However, if the hypervisor 110 monitors a status of the hypervisor 110, Domain 0 150, and user domains or accesses to a status code saved in the data storage 170 that indicates a status of Domain 0 150 and user domains, the exemplary monitoring system using the command line interface 130 and the BMC 200 described above may not be additionally necessary.

In operation S620, the server 100 may write the status code into the MSR 121, which is accessible from the BMC 200. In particular, the hypervisor 110 may request the processor 160 to write the status code into the MSR 121. Then, the processor 160 of the server 100 may write the state code into the MSR 121. The MSR 121 may be on the server 100 or on the BMC 200. The server 100 may write the status code into the MSR 121 at regular intervals. The signals written on a regular basis can be used as a heartbeat to synchronize other hardware connected to the BMC 200. Even when the server 100 is unresponsive or in a crash state, this out-of-band communications is still operational and can work to snoop on the cause of the system failure and report it to the alert management system 300 almost in real time.

In operation S630, the BMC 200 determines whether the BMC 200 has received the status code by reading the MSR 121. If the BMC 200 has received the status code of the server 100, in operation S680, the status code of the server 100 is sent to the alert management system 300. If the BMC has not received the status code of the server 100, then in operation S640, the BMC 200 determines whether a predetermined time has elapsed. If the predetermined time has not elapsed, then operation S640 is returned to operation S630. If it is determined in operation S640 that the predetermined time has elapsed, then in operation S650, the BMC 200 makes a tentative conclusion that the server 100 is in error. This failure to receive the status code may include scenarios in which the BMC 200 anticipates status codes to be received at regular intervals, but does not receive a status code after an interval. This tentative conclusion causes the status code to be overwritten as an error status code in operation S650. However, after the status code is overwritten due to the elapsed time, in operation S660, it is redetermined whether the BMC 200 has received the status code of the server 100. If the BMC 200 has received the status code of the server 100, in operation S670, the status code in operation S650 is overwritten to the status code received from the MSR 121. This may prevent the BMC 200 from sending an error message to the alert management system 300 too hastily when network traffic may delay the status code from being received. In operation S680, the BMC 200 sends the status code to the alert management system 300 when the status code indicates an error on the server 100. In one configuration, the status code may be sent to the alert management system 300 only when the status code indicates an error on the server 100. In another configuration, the status code may be sent to the alert management system 300 regardless of the indication of an error on the server 100. In that case, the alert management system 300 may filter out error status codes and handle the error on the server 100.

Since these operations are automatically processed, the alert management system 300 would readily know the software error on the server 100 almost in real time.

5. CONCLUSION

Exemplary server status monitoring systems and methods using the BMC 200 described above in detail would enable a software error on the server 100 to be identified almost in real time. Accordingly, these exemplary systems and methods can overcome time delay and difficulty in finding the root cause of the failure of the server 100 in the retroactive diagnostic method.

According to one aspect of the present disclosure, a system for monitoring a status of a server using a baseboard management controller comprises: the baseboard management controller, wherein the baseboard management controller is configured to: connect to the server; open a session of a command line interface on the server; send a status code request through the session of the command line interface to the server; determine whether the baseboard management controller has received a status code from the server through the session of the command line interface in response to the status code request; when the baseboard management controller has not received the status code within a predetermined time, overwrite the status code as an error status code; and send the status code to an alert management system when the status code indicates an error on the server.

In this aspect, the baseboard management controller is further configured to: after overwriting the status code as the error status code, determine again whether the baseboard management controller has received a second status code from the server; and when the baseboard management controller has received the second status code from the server after overwriting the status code as the error status code, overwrite the overwritten status code as the second status code received from the server.

In this aspect, a universal asynchronous receiver-transmitter (UART) is disposed in the baseboard management controller to receive the status code from the server, and the baseboard management controller opens the session of the command line interface over the UART to receive the status code from the server.

In this aspect, the status code is sent to the baseboard management controller at regular intervals.

In this aspect, the command line interface on the server accesses the domain 0 to retrieve the status code.

In this aspect, the status code of the server is generated in a Domain 0 of the server.

In this aspect, the status of the server is the status of a software running on the server.

In this aspect, the software comprises a Domain 0 of the server.

In this aspect, when the software is in an error-free status, the status code indicates an error-free status of the software, and when an error exists in the software, the status code indicates a cause and a location of the error.

In this aspect, a connection between the baseboard management controller and the command line interface conforms to a serial over local area network (SOL).

According to another aspect of the present disclosure, a method of monitoring a status of a server using a baseboard management controller comprises: determining whether a status code of the server has been received from the server by reading the status code provided on the input/output port of the server, wherein the status code of the server indicates the status of software running on the server; when the baseboard management controller has not received the status code within a predetermined time, overwriting the status code as an error status code; and sending the status code from the baseboard management controller to an alert management system when the status code indicates an error on the server.

In this aspect, the method further comprises generating the status code of the server in a hypervisor of the server; and sending the status code from the hypervisor of the server to a serial input/output port of the baseboard management controller.

In this aspect, the input/output port of the server is a port 80h of the server.

In this aspect, after overwriting the status code as the error status code, determining again whether the baseboard management controller has received a second status code from the server; and when the baseboard management controller has received the second status code from the server after overwriting the status code as the error status code, overwriting the overwritten status code as the second status code received from the server.

In this aspect, the software comprises the hypervisor.

In this aspect, when the software is in an error-free status, the status code indicates an error-free status of the software, and when an error exists in the software, the status code indicates a cause and a location of the error.

According to another aspect of the present disclosure, a method of monitoring a status of a server using a baseboard management controller comprises: determining whether the baseboard management controller has received a status code of the server by reading a model specific register, wherein the status code of the server indicates the status of software running on the server; when the baseboard management controller has not received the status code within a predetermined time, overwriting the status code as an error status code; and sending the status code from the model specific register to an alert management system when the status code indicates an error on the server.

In this aspect, the method further comprises: generating a status code of the server in a hypervisor of the server; and writing the status code from the server into the model specific register.

In this aspect, the software comprises the hypervisor.

In this aspect, the software is in an error-free status, the status code indicates an error-free status of the software, and when the error exists in the software, the status code indicates a cause and a location of the error.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer-readable medium can also include nontransitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system for monitoring a status of a server using a baseboard management controller, comprising: the baseboard management controller,
   wherein the baseboard management controller is configured to:
      connect to the server;
      open a session of a command line interface on the server;
      send a status code request through the session of the command line interface to the server;
      determine whether the baseboard management controller has received a status code from the server through the session of the command line interface in response to the status code request;
      when the baseboard management controller has not received the status code within a predetermined time, overwrite the status code as an error status code; and send the status code to an alert management system when the status code indicates an error on the server.

2. The system of claim 1, wherein the baseboard management controller is further configured to:
after overwriting the status code as the error status code, determine again whether the baseboard management controller has received a second status code from the server; and
when the baseboard management controller has received the second status code from the server after overwriting the status code as the error status code, overwrite the overwritten status code as the second status code received from the server.

3. The system of claim 1, wherein a universal asynchronous receiver-transmitter (UART) is disposed on the baseboard management controller,
wherein the baseboard management controller opens the session of the command line interface over the UART to receive the status code from the server.

4. The system of claim 1, wherein the status code is sent to the baseboard management controller at regular intervals.

5. The system of claim 4, wherein the command line interface on the server accesses a Domain 0 to retrieve the status code.

6. The system of claim 1, wherein the status code received from the server is generated in a Domain 0 of the server.

7. The system of claim 1, wherein the status of the server is a status of software running on the server, and
wherein the software comprises a Domain 0 of the server.

8. The system of claim 7, wherein when the software has an error-free status, the status code indicates an error-free status of the software, and
wherein when the error exists in the software, the status code indicates a cause and a location of the error.

9. The method of claim 1, wherein a connection between the baseboard management controller and the command line interface conforms to a serial over local area network (SOL).

10. A method of monitoring a status of a server using a baseboard management controller, comprising:
determining whether a status code of the server has been received from the server by reading the status code provided on an input/output port of the server, wherein the status code of the server indicates a status of software running on the server;
when the baseboard management controller has not received the status code within a predetermined time, overwriting the status code as an error status code; and
sending the status code from the baseboard management controller to an alert management system when the status code indicates an error on the server.

11. The method of claim 10, further comprising generating the status code of the server in a hypervisor of the server; and
sending the status code from the hypervisor of the server to the serial input/output port of the baseboard management controller.

12. The method of claim 10, wherein the input/output port of the server is an input/output port 80h of the server.

13. The method of claim 10, wherein after overwriting the status code as the error status code, determining again whether the baseboard management controller has received a second status code from the server; and
when the baseboard management controller has received the second status code from the server after overwriting the status code as the error status code, overwriting the overwritten status code as the second status code received from the server.

14. The method of claim 10, wherein the software comprises a hypervisor.

15. The method of claim 10, wherein when the software has an error-free status, the status code indicates an error-free status of the software,
wherein when the error exists in the software, the status code indicates a cause and a location of the error.

16. A method of monitoring a status of a server using a baseboard management controller, comprising:
determining whether the baseboard management controller has received a status code of the server by reading a model specific register, wherein the status code of the server indicates a status of software running on the server;
when the baseboard management controller has not received the status code within a predetermined time, overwriting the status code as an error status code; and
sending the status code of the server to an alert management system when the status code indicates an error on the server.

17. The method of claim 16, further comprising: generating the status code of the server in a hypervisor of the server; and
writing the status code from the server into the model specific register.

18. The method of claim 16, wherein the software comprises a hypervisor.

19. The method of claim 16, wherein when the software has an error-free status, the status code indicates an error-free status of the software,
wherein when the error exists in the software, the status code indicates a cause and a location of the error.

* * * * *